(12) United States Patent
Brummit

(10) Patent No.: US 11,243,154 B2
(45) Date of Patent: Feb. 8, 2022

(54) FOAM DISPLACEMENT INDICATOR

(71) Applicant: Irvin Automotive Products, LLC, Pontiac, MI (US)

(72) Inventor: Richard Kenji Brummit, Rochester Hills, MI (US)

(73) Assignee: IRVIN AUTOMOTIVE PRODUCTS, LLC, Pontiac, MI (US)

(*) Notice: Subject to any disclaimer, the term of this patent is extended or adjusted under 35 U.S.C. 154(b) by 135 days.

(21) Appl. No.: 16/660,154

(22) Filed: Oct. 22, 2019

(65) Prior Publication Data

US 2021/0116343 A1    Apr. 22, 2021

(51) Int. Cl.
*G01N 3/42* (2006.01)

(52) U.S. Cl.
CPC ........................................ *G01N 3/42* (2013.01)

(58) Field of Classification Search
CPC ........................................................ G01N 3/42
See application file for complete search history.

(56) References Cited

U.S. PATENT DOCUMENTS

| | | | |
|---|---|---|---|
| 1,802,685 A | 4/1931 | Trier | |
| 2,421,449 A | 6/1947 | Zuber | |
| 2,656,716 A | 10/1953 | Hoggatt | |
| 2,792,634 A | 5/1957 | Howe et al. | |
| 2,818,727 A | 1/1958 | Euverard | |
| 3,534,480 A | 10/1970 | Webb | |
| 3,765,025 A | 10/1973 | Zietzke et al. | |
| 3,805,599 A | 4/1974 | Illman et al. | |
| 3,965,727 A | 6/1976 | Argabrite | |
| 4,004,457 A | 1/1977 | Eide et al. | |
| 4,107,978 A | 8/1978 | Ernst | |
| 4,138,883 A | 2/1979 | Talbert | |
| 4,140,008 A * | 2/1979 | Golembeck | A47C 31/123 73/161 |
| 4,245,496 A | 1/1981 | Napetschnig | |
| 4,277,174 A | 7/1981 | Kleesattel | |
| 4,331,026 A | 5/1982 | Howard et al. | |
| 4,578,875 A | 4/1986 | Vertin | |
| 4,899,577 A | 2/1990 | Fischer | |
| 4,956,994 A | 9/1990 | Lue | |
| 6,298,570 B1 | 10/2001 | Maughan et al. | |

(Continued)

FOREIGN PATENT DOCUMENTS

JP    2006-329935    12/2006
KR    20-2012-0004882    7/2012

*Primary Examiner* — David Z Huang
(74) *Attorney, Agent, or Firm* — Raggio & Dinnin, P.C.

(57) ABSTRACT

A seat foam inspection gage including a foam displacement indicator is used for inspecting seat foam on site at a manufacturing plant. The seat foam inspection gage includes a cylindrical body and a ball arranged within the body. The seat foam inspection gage also includes an indicator arranged on a top surface of the body, wherein the indicator measures distance of a foam displacement of the seat foam at a seat manufacturing facility. The seat foam inspection gage may take the distance of foam displacement and convert that number into an IFD number, thus allowing for quick comparison of seat foam hardness across an entire seating surface and across all seats being manufactured in a facility without having to send the seat foam to an offsite quality control lab to measure the IFD with large frame machinery.

19 Claims, 5 Drawing Sheets

(56) References Cited

U.S. PATENT DOCUMENTS

| | | | |
|---|---|---|---|
| 6,539,809 B1 | 4/2003 | Weiss et al. | |
| 6,786,083 B1* | 9/2004 | Bain | A47C 31/123 |
| | | | 73/78 |
| 8,857,246 B2 | 10/2014 | Guerout et al. | |
| 9,046,456 B2 | 6/2015 | Furuta et al. | |
| 9,366,610 B2 | 6/2016 | Zhang et al. | |
| 2010/0192680 A1* | 8/2010 | Brandestini | G01N 3/48 |
| | | | 73/82 |
| 2012/0085155 A1* | 4/2012 | Guerout | G01N 3/42 |
| | | | 73/82 |
| 2013/0174653 A1* | 7/2013 | Sawa | G01N 3/42 |
| | | | 73/82 |
| 2016/0245735 A1 | 8/2016 | Mazzoleni | |

* cited by examiner

FOAM DISPLACEMENT INDICATOR

BACKGROUND OF THE INVENTION

1. Field of the Invention

The present invention generally relates to a seat foam inspection gage, and more particularly relates to a hand held portable seat foam inspection gage capable of measuring seat foam on site.

2. Description of Related Art

Vehicle seats have been well known and have used a foam material for many years. Many different types and designs have been used for vehicle seats and the foam used to create such seats. Generally, a vehicle seat which includes a seat back and seat cushion having seat foam has a uniform indention force deflection across the seat foam in order to create an aesthetically pleasing and comfortable seat trim fit. If the indention force deflection varies across the surface of a seat cushion or seat back it may create variation in the fit of the seat trim and affect the look and comfort of the seat to the user of the vehicle. Therefore, during the manufacturing process of the seat back and seat cushion of a vehicle seat, the indention force deflection should be uniform across both the seat cushion and the seat back of a vehicle seat. In the prior art, the seat foam for both the seat back and seat cushion of a vehicle seat generally had to be sent to a quality control lab where a large frame machine that requires fixturing and set up time is used to measure the indention force deflection of vehicle seat foam. This is a costly and time consuming process to inspect seat foam hardness to determine if uniform seat foam hardness is being properly manufactured into the seat backs and seat cushions.

Therefore, there is a need in the art for an improved seat foam inspection gage having a foam displacement indicator. Furthermore, there is a need in the art for a hand held foam displacement indicator which is portable and may allow for inspection of seat foam hardness on site at the seat manufacturing facility. There is a need in the art for a hand held seat foam inspection gage that is capable of comparing foam hardness on multiple samples to look for deviations in data that may cause variation in the fit of seat trim. There is also a need in the art for a seat foam inspection gage that may quickly inspect seat foam hardness and convert the data to indention force deflection measurements to inform the user if the inspected foam is in the range identified by drawing requirements for the seat back and seat cushion. There is also a need in the art for a seat foam inspection gage that may reduce the need for off site indention force deflection measurements if the converted readings from the hand held foam displacement indicator are in a predetermined range thus providing a quick solution to compare seat foam hardness on site of the seat manufacturing process.

SUMMARY OF THE INVENTION

One object of the present invention may be that it provides an improved seat foam inspection gage.

Another object of the present invention may be that it provides a seat foam inspection gage that includes a hand held foam displacement indicator to inspect seat foam hardness on site.

Still a further object of the present invention may be that it provides a seat foam inspection gage that may compare foam hardness on multiple samples to look for deviations in data that may cause variation in the fit of seat trim.

Yet another object of the present invention may be that it provides a seat foam inspection gage that may quickly measure foam via a foam displacement indicator. The seat foam inspection gage may convert that data to indention force deflection measurements to let the operator know if the inspected seat foam is in a range acceptable to the drawing requirements provided.

Yet another object of the present invention may be that it provides a seat foam inspection gage that may reduce the time and need for sending seat backs and seat cushions to a lab for indention force deflection measurements, if the seat foam displacement indicator readings are in a range after a conversion, that satisfies the drawing requirements therefore.

Still a further object of the present invention may be to provide a seat foam inspection gage that allows for reduced time in measuring seat foam hardness and lower costs as seat backs and seat cushions of a vehicle seat do not have to be sent to a quality control lab for indention force deflection measurements.

According to the present invention, the foregoing and other objects and advantages are obtained by a novel design for a seat foam inspection gage including a foam displacement indicator. The seat foam inspection gage comprises a cylindrical body and a ball arranged within the body. The seat foam inspection gage further comprises a displacement indicator arranged on a top surface of the body, wherein the displacement indicator measures a distance of a foam displacement on a vehicle seat back or seat cushion. The seat foam inspection gage allows for a hand held on site portable solution to inspect seat foam hardness to determine if the seat foam hardness falls within a range of the engineering drawing requirements. The seat foam inspection gage being a hand held device, allows for a quick solution to compare seat foam hardness on site without the need to send the seat foam to a quality control lab for the well known in the prior art indention force deflection measurements.

One advantage of the present invention may be that it provides for an improved seat foam inspection gage.

Another advantage of the present invention may be that it provides for a hand held seat foam inspection gage that includes a foam displacement indicator arranged therein.

Still another advantage of the present invention may be that it provides for a seat foam inspection gage that offers a portable solution to inspect seat foam hardness on site of the seat foam manufacturing process.

Still another advantage of the present invention may be that it provides a seat foam inspection gage that may compare seat foam hardness on multiple samples to look for deviations in data that may cause variation in the fit of seat trim on either the seat back or seat cushion.

Yet another advantage of the present invention may be that it provides for a seat foam inspection gage that may quickly measure foam displacement of a seat foam hardness and convert that data to indention force deflection measurements to inform the hand gage operator if the inspected seat foam hardness is within the range of the engineering drawing requirements.

Still another advantage of the present invention may be that it provides a seat foam inspection gage that reduces the cost and the time required to compare seat foam hardness by completing such task on site versus sending the seat foam to a quality control lab to be measured via a large frame machine.

Other objects, features and advantages of the present invention may become apparent from the subsequent description and appended claims, taken in conjunction with the accompanying drawings.

BRIEF DESCRIPTION OF THE EMBODIMENT(S)

Figure 1:
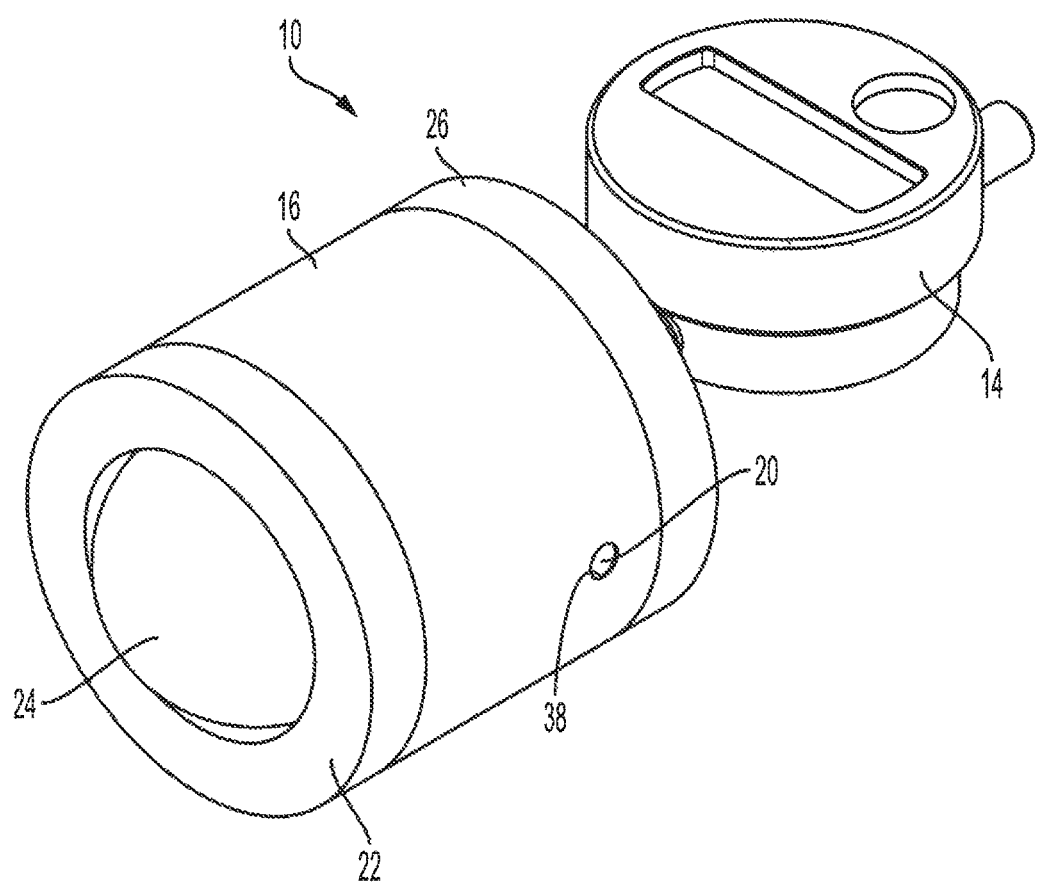
FIG. 1 shows a plan view of a seat foam inspection gage according to the present invention.
Figure 4:
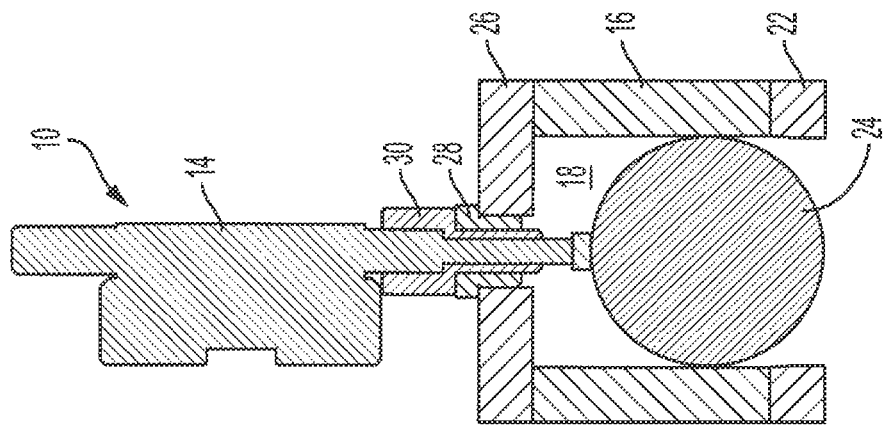
FIG. 4 shows a cross section of a seat foam inspection gage taken along line 4-4 of FIG. 2.
Figure 3:
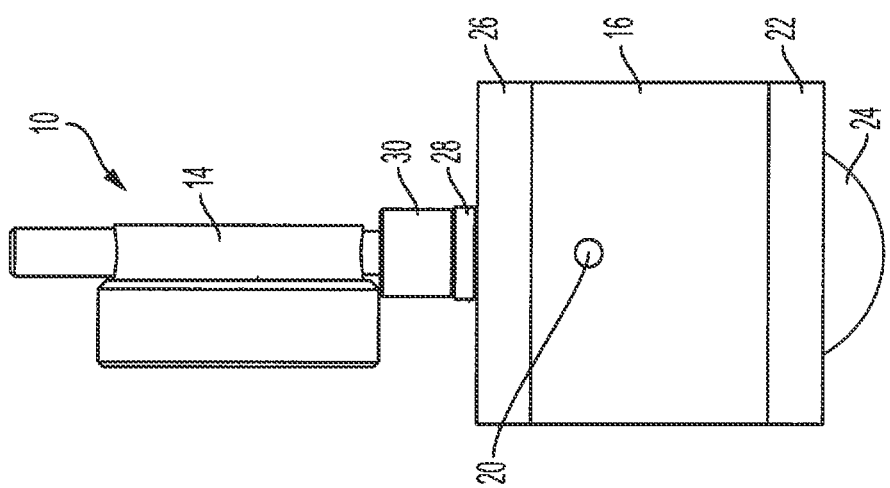
FIG. 3 shows a side view of a seat foam inspection gage according to the present invention.
Figure 2:
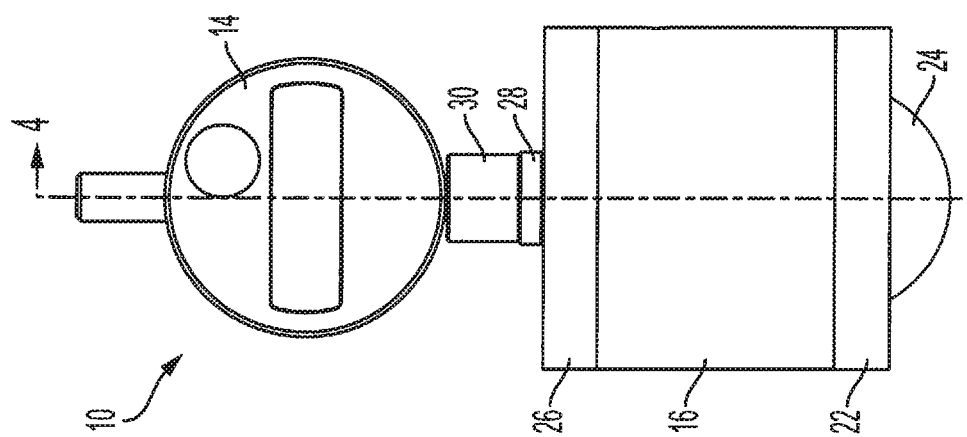
FIG. 2 shows a front view of a seat foam inspection gage according to the present invention.
Figure 5:
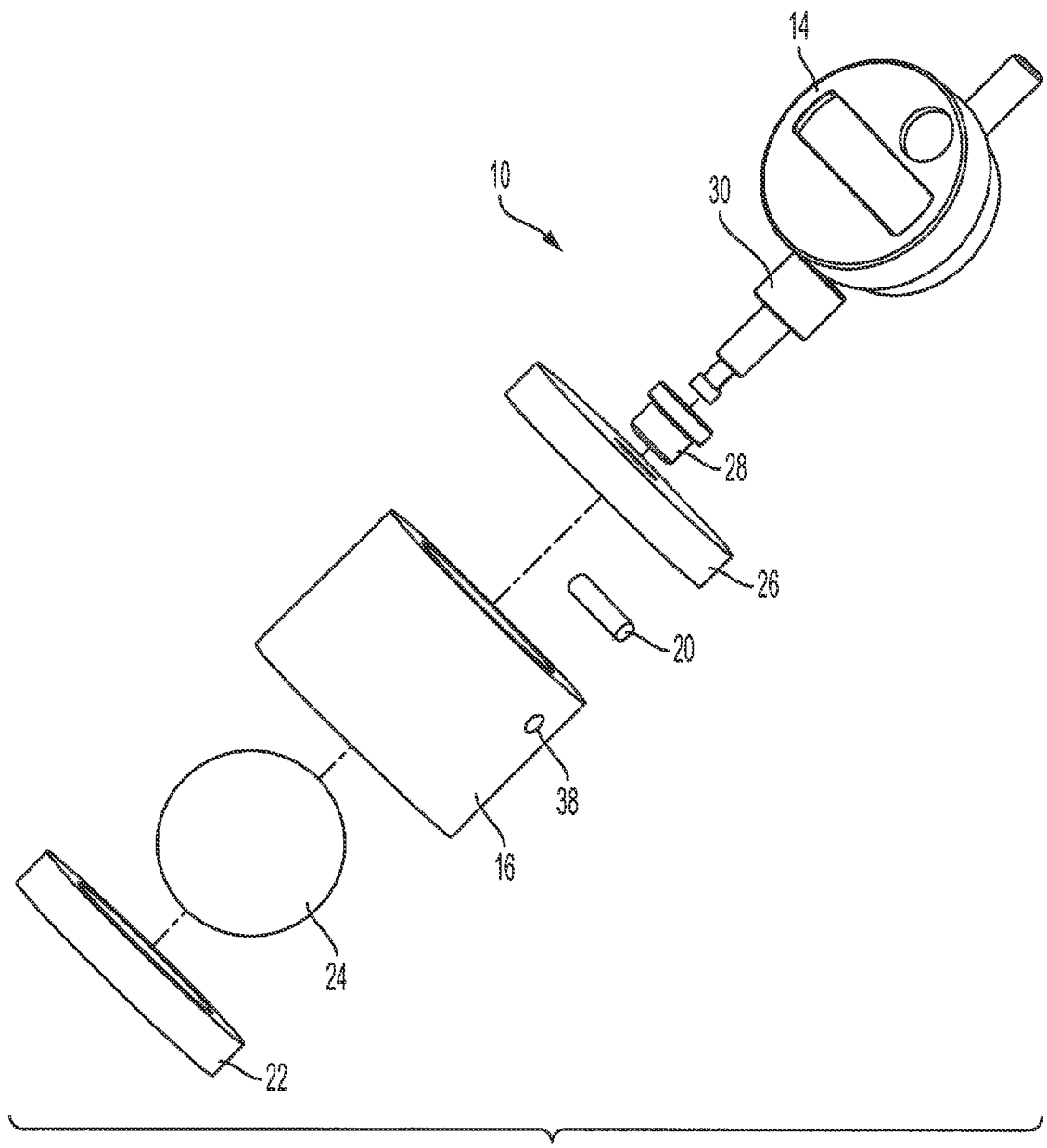
FIG. 5 shows an exploded view of a seat foam inspection gage according to the present invention.
Figure 6:
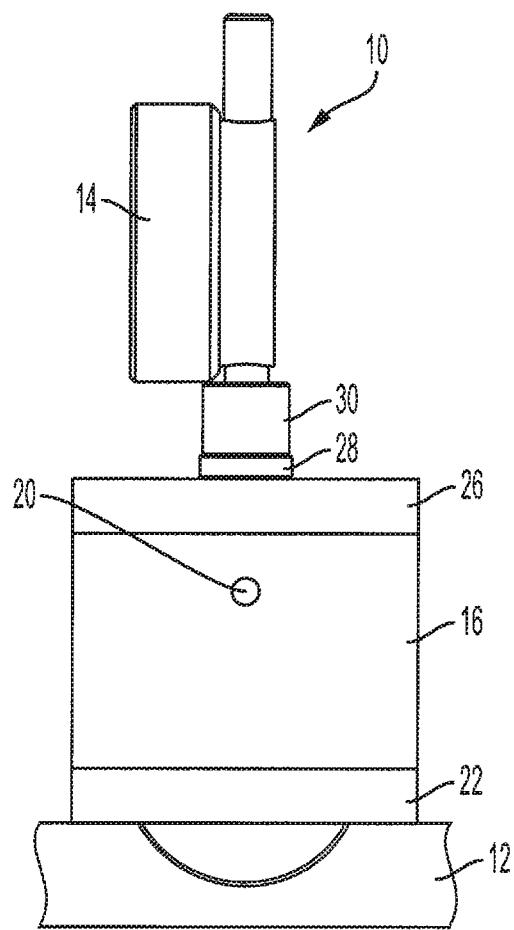
FIG. 6 shows a side view of a seat foam inspection gage taking a measurement of seat foam according to the present invention.
Figure 7:
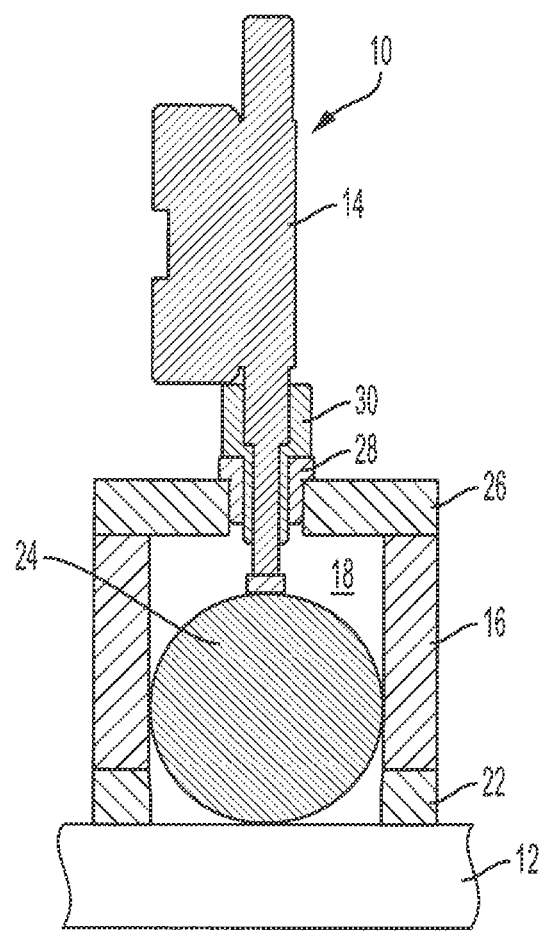
FIG. 7 shows a cross sectional side view of a seat foam inspection gage taking a foam displacement reading.
Figure 8:
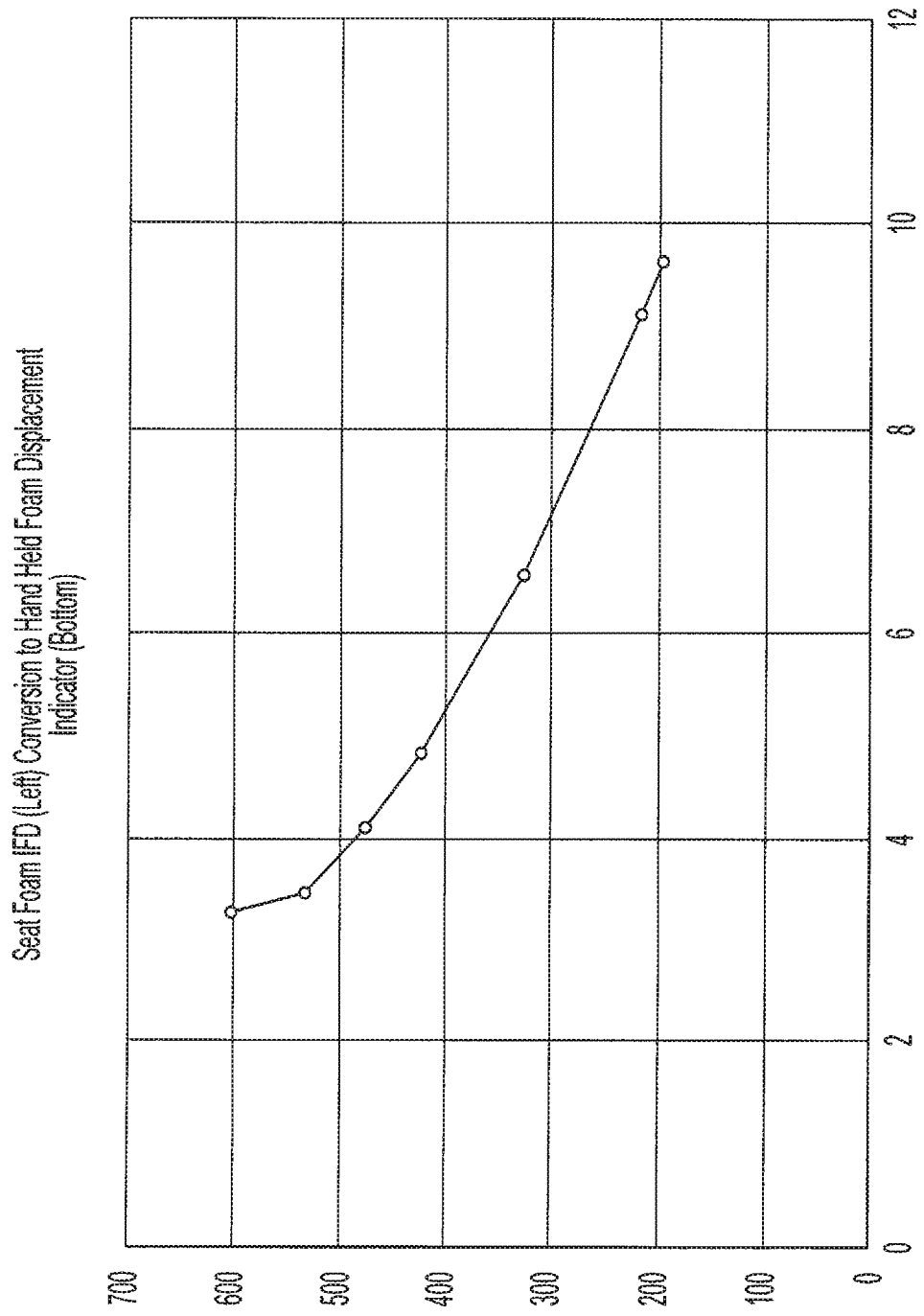
FIG. 8 shows a conversion chart for the seat foam inspection gage according to the present invention.

Referring to the drawings, there is shown a seat foam inspection gage 10 according to an embodiment of the present invention. Generally, the present invention provides a portable solution to inspect seat foam 12 hardness on site at a seat manufacturing facility. The seat foam inspection gage 10 is a hand held device which includes a foam displacement indicator 14, wherein the seat foam inspection gage 10 is capable of comparing foam hardness on multiple samples to look for deviations in data of the seat foam hardness that may cause variation in the fit of seat trim for either a vehicle seat back or seat cushion. Generally, in a vehicle a plurality of seats are arranged within a cabin of the vehicle. The seats generally include a seat back and a seat cushion and include a frame over which seat foam 12 is arranged to provide for an aesthetically pleasing look and comfort to the user of the vehicle seat. Generally, in the prior art, indention force deflection (IFD) measurements are made for the seat foam 12 used in vehicle seats. However, these IFD measurements in the prior art have to be made at a quality control lab, where a large frame machine that requires fixturing and set up time may properly measure IFD for the seat foam 12 of a vehicle seat. This prior art process is time consuming and expensive as the quality control labs generally are a separate facility from the seat manufacturing facilities. It should be noted that in the contemplated embodiment the seat foam inspection gage 10 may be used to measure foam displacement/seat foam hardness across the entire seat cushion and seat back surface of a vehicle seat. However, the seat foam inspection gage 10 may also be used for components other than vehicle seats. It should be noted that the vehicle seat may be used in an automotive vehicle, an aeronautical vehicle, a space vehicle, a marine vehicle, or any other known vehicle which includes a seat having seat foam 12 as a component thereof. As noted above, the seat foam inspection gage 10 may also be used to inspect other types of foam other than seat foams in other industries other than vehicular industries. The seat foam inspection gage 10 of the present invention may be capable of quickly inspecting seat foam hardness and then converting that data to IFD measurements in order to allow the seat foam inspection gage operator to determine if the inspected seat foam 12 is in the range required by the engineering drawing requirements. It should be noted that the seat foam inspection gage 10 may be capable of reducing the time necessary for inspecting the seat foam hardness and the need for IFD measurements to be made at a quality control lab because if the conversion readings of the present invention are in a predetermined range, this would allow for a quick solution on site of the seat foam manufacturing to compare seat foam hardness. It should be noted that all components of the seat foam inspection gage 10 generally are made of a steel material, aluminum material, or a type of plastic or composite material. However, it should be noted that any other type of metal, plastic, composite, ceramic, natural material, or manmade material may be used for any of the components identified hereafter for the seat foam inspection gage 10.

The seat foam inspection gage 10 of the present invention is a hand held device that may include a foam displacement indicator 14 arranged therewith. The seat foam inspection gage 10 generally includes a body 16. In one contemplated embodiment, the body 16 has a cylindrical shape, however any other shape may also be used. The cylindrical body 16 generally may have an inner bore 18 with a predetermined inner diameter. The cylindrical body 16 may have a predetermined outer diameter. It should be noted that the body 16 may also have a predetermined length. It one contemplated embodiment, the seat foam inspection gage cylindrical body 16 generally may have approximately a 51.5 millimeter length, while also having an approximate 50.93 millimeter inner diameter for the inner bore 18 of the cylindrical body 16. It should be noted that any other dimensions may be used for the cylindrical body 16 from zero to many thousand millimeters in length and zero too many thousand millimeters of an inner diameter of the inner bore of the cylindrical body. In one contemplated embodiment, a hard coat aluminum material is 18 used for the cylindrical body 16. It should be noted that it is also contemplated that the inner diameter of the bore 18 of the cylindrical body 16 may have a uniform diameter throughout the entire length of the body 16. It is also contemplated that a plurality of generally circular orifices may be arranged in a top edge and a bottom edge at predetermined intervals of the body 16. These orifices generally are circular in shape as described above, but may be any other shape depending on the design requirements. It is also contemplated that these orifices may be threaded in order to receive a fastener therein in order to secure other components to either the top edge or surface of the body 16 or the bottom edge or surface of the body 16. It should be noted that any known thickness may be used for the walls of the body 16 of the seat foam inspection gage 10. Arranged at a predetermined position through the wall of the body 16 may be an orifice 38. This orifice 38 which is arranged entirely through the width of the wall of the cylinder body 16 generally may have a circular shape. This orifice 38 may have a predetermined diameter depending on the design requirements. It should be noted that a plurality of orifices 38 may be arranged through the cylinder wall of the body 16. In one contemplated embodiment a dowel 20 is arranged through the orifice 18 through the cylinder wall of the body 16, wherein the dowel 20 is made of a steel material. It should be noted that any other type of material may be used for either the dowel 20 or the cylinder body 16. In one contemplated embodiment, the dowel 20 arranged through the orifice 38 of the cylinder wall of the body 16 may extend a predetermined distance into the inner bore 18 of the cylinder body 16. It should be noted that the steel dowel 20 generally is arranged within the orifice 38 via a press fit, however any other type of fastening technique, either chemical or mechanical, may be used including but not limited to threads, glue, epoxy, welding, etc.

The seat foam inspection gage 10 also may include a first or bottom plate 22 secured to and in contact with a bottom surface of the cylinder body 16. In one contemplated embodiment, the first plate 22 is a ring plate that may have a predetermined outer diameter. The first plate 22 may have a predetermined inner diameter having a tapered inner diameter. In one contemplated embodiment, the first ring plate 22 is also made of an aluminum material, however any other type of steel, plastic, ceramic, composite or any other man made or natural material may also be used. The first plate 22, which is secured to the bottom surface of the cylinder body 16 may be secured via any known mechanical or chemical fastening technique, such as but not limited to welding, gluing, epoxy, fasteners arranged through orifices of the first ring plate 22 and into a receiving orifice in a bottom edge of the cylinder body 16. Therefore, either threaded fasteners or any other type of fastener or welding or any other type of chemical fastening technique may be used to secure the first ring plate 22 to a bottom surface of the cylinder body 16. The inner diameter of the first plate 22 may have a tapered inner diameter. This tapered diameter may be larger at the bottom edge thereof. Therefore, the inner diameter of the first plate 22 at the top edge thereof is generally the same as the inner diameter of the cylinder body 16 and then tapers to a narrower diameter by the bottom edge of the first plate 22. In one contemplated embodiment, the bottom edge inner diameter of the first plate 22 is approximately 50 millimeters, wherein the top edge diameter of the first plate 22 is approximately 50.93 millimeters. However, it should be noted that any other dimensions for the tapered inner diameter may be used for the first plate 22 other than those dimensions given herein. Arranged within the inner bore 18 of the cylinder body 16 may be a ball 24. In one contemplated embodiment, a stainless steel ball 24 having approximately 2.7 kgs of weight is arranged therein. It should be noted that any other type of material, other than stainless steel, may be used for the ball 24 and that any other size or weight of ball 24 may also be used. Generally, the outer diameter of the ball 24 may be slightly less than the inner diameter of the cylinder body 16. However, it should be noted that the outer diameter of the ball 24 may also be slightly larger than the bottom edge inner diameter of the first plate 22, thus ensuring that the ball 24 may always remain within the inner bore 18 of the cylinder body 16 via the reduced or tapered diameter of the first plate 22 at the bottom edge thereof. Thus, the steel ball 24 is arranged within the inner bore 18 of the cylinder body 16 and then the first plate 22 is secured to the bottom surface of the cylinder body 16, wherein the bottom surface of the cylinder body 16 may engage and make contact with a top surface of the first plate 22, thus trapping or capturing the ball 24 within the cylinder body inner bore 18, such that the ball 24 is not capable of falling from the seat foam inspection gage 10 during use. It should further be noted that the ball 24 may be capable of movement within the cylinder body 16, thus the ball 24 may be capable of moving in an up and down motion with respect to a centerline of the seat foam inspection gage 10. This may allow the ball 24 to move within the inner bore of both the first plate 22 and the cylinder body 16. It should be noted that the taper from the top edge to the bottom edge of the first plate 22 may have any known angle. The seat foam inspection gage 10 also may include a second or top plate 26 secured to and in contact with a top surface of the cylinder body 16. It should be noted that the top plate 26 generally is a ring plate such as the first plate 22 described above. However, the inner diameter of the orifice of the top ring plate 26 is much smaller than the inner diameter of the bottom plate 22. The inner diameter of the top plate 26 also may be uniform, having one predetermined size. It should be noted that the top plate 26 may also include a plurality of orifices through a surface thereof in order to allow for a fastener to be arranged through the top plate 26 and then into a predetermined threaded or non-threaded orifice in a top edge of the cylinder body 16. Therefore, as described above, the top plate 26 may be secured to the top surface of the cylinder body 16 via any known mechanical or chemical fastening technique, such as but not limited to welding, epoxy, glue or fasteners arranged through orifices of the top plate 26 into threaded orifices or non-threaded orifices arranged in a top edge of the cylinder body 16. It should be noted that any number of fasteners from one up to many hundred may be used to secure either the second plate 26 to the top surface of the cylinder body 16 or the first plate 22 to the bottom surface of the cylinder body 16. It should further be noted that the second plate 26 also may be made in one contemplated embodiment of a hard coat aluminum material, however any other steel, metal, plastic, composite, ceramic, man made or natural material may be used to create the second or first plate 26, 22. It should be noted that the outer diameter of both the top plate 26 and bottom plate 22 is generally the same as the outer diameter of the cylinder body 16. This creates a smooth outer surface for the seat foam inspection gage 10. It should be noted that the orifice of the first or second plate 22, 26 may have any known shape other than circular as shown.

Arranged within the orifice of the top plate 26 may be a bushing 28. The bushing 28 may be a headed bushing and may include either a circular outer surface or a faceted outer surface that has a plurality of faces forming a bolt like outer surface. The bushing 28 may be secured within the orifice, such that an outer surface of the bushing 28 may engage with the inner diameter of the second plate 26 and be securely connected therein. This connection may be formed via either a press fit, a threaded system, or via any chemical or mechanical fastening technique, such as an epoxy, welding, etc. The bushing 28 may also include a shoulder or lip on a top surface thereof, wherein a surface of the shoulder or lip may engage with a top surface of the second plate 26 when the bushing 28 is fully inserted within the orifice of the second plate 22. The outer diameter of the bottom portion of the bushing 28 may be approximately equal to or slightly smaller than the diameter of the orifice through the second plate 26. This may allow for a press fit arrangement or for threads to be arranged thereon secure the bushing 28 into the orifice. It should be noted that in one contemplated embodiment a H-40-6 headed bushing is the bushing 28 of choice, however any other type of bushing may also be used. It should be noted that the bushing 28 may also include a predetermined sized inner diameter therethrough. This inner diameter allows for an inner bore to be formed within the bushing 28.

Arranged within the inner bore of the bushing 28 may be a collar 30. In one contemplated embodiment, the collar 30 is made of a steel material, however any other known metal, ceramic, plastic, composite, man made or natural material may also be used for the collar 30. The collar 30 generally has a body with a cylindrical flange extending from a surface thereof. In the seat foam inspection gage 10 of the present invention, the circular flange is arranged through the inner bore of the bushing 28 such that the outer surface of the circular flange engages with an inner surface of the bushing 28. Thus, the outer diameter of the cylindrical flange of the steel collar 30 generally has the same or slightly smaller diameter than the inner diameter of the inner bore of the bushing 28. The cylindrical body portion of the collar 30 may have a surface that engages with an outer surface of the bushing 8, such that the outer diameter of the body of the collar 30 is generally the same as or slightly smaller than the outer diameter of the shoulder of the bushing 28. The collar 30 may also have a predetermined sized inner bore arranged along the entire length thereof. In one contemplated embodiment, the steel collar 30 may have an inner bore that has a first section with a predetermined inner diameter with a first dimension and a second section with a reduced diameter portion for the remainder of the inner bore of the collar 30. The reduced diameter portion generally is arranged within the cylindrical flange extending from the cylindrical body of the collar 30. It should be noted that a press fit is generally used to secure the collar 30 within the bushing 28 however, any other type of chemical or mechanical fastening techniques, such as those described above, may be used to secure the collar 30 within the bushing 28. It should be noted that any known dimensions may be used for either the bushing 28, or the collar 30 according to the present invention.

Arranged within the inner bore of the collar 30 may be a foam displacement indicator 14. In one contemplated embodiment a Mitutoyo absolute digimatic indicator IDS Series 543 may be the indicator 14 arranged therein. It should be noted that this indicator 14 is capable of measuring displacement within a range of approximately zero to 12.7 millimeters, it also may be able to determine force of two newtons or less. It should be noted that any other known indicator 14 may also be used other than that described above, as long as that indicator 14 is capable of measuring displacement of in the range of zero to 12.7 millimeters. The indicator 14 generally has a cylindrical body with a circular face and a plurality of buttons arranged thereon. The face may also include an LCD or other type of screen for displaying readings of displacement thereon. A displacement arm extends from a bottom surface thereof while a control knob is arranged off a top surface thereof. It should be noted that the buttons on the front face of the indicator 14 may include a reset, on/off and calibration feature, etc. The indicator 14 is capable of measuring between zero and 12.7 millimeters of displacement from a zero or initial start position. It should be noted that any other type of indicator apparatus may be used other than the one described herein, as long as it is capable of measuring between zero and 12.7 millimeters in a linear direction. It should be noted that the indicator 14 may be made of any known metal, ceramic, plastic, or other material and that it may also include the necessary battery or power source in order to operate and record displacement readings for the life of the seat foam inspection gage 10. The displacement measurement arm is arranged within the inner diameter of the collar 30, wherein the displacement measurement arm of the indicator 14 may have a first section with a first diameter and a second section with a smaller second diameter, such that the displacement arm is arranged within the dual diameter collar 30 and is seated and arranged therein. Arranged on the end of the displacement measurement arm may be a contact point apparatus that generally has a larger diameter than the inner diameter of the cylindrical flange of the collar 30, hence ensuring that the indicator 14 may remain secured to the collar 30 during operation of the hand held seat foam inspection gage 10 according to the present invention. The contact point apparatus also may directly engage with an outer surface of the ball 24 that is arranged within the inner bore 18 of the cylinder body 10. Hence, the displacement arm may also be arranged within the inner bore 18 of the body 16 of the seat foam inspection gage 10 and may contact the ball 24 during displacement measurements of the seat foam 12. It should be noted that the dowel 20 that is arranged within the cylinder wall of the body 16 may be used to engage with the ball 24 as a stop in order to keep the ball 24 from moving too far in an upward direction in the inner bore 18 towards the second plate 26 of the seat foam inspection gage 10. It should be noted that the ball 24 is capable of moving between a first predetermined position and a second predetermined position, wherein one of the positions may be defined by the reduced diameter bottom edge of the first plate 22. The indicator 14 may be replaced with any other known indicator depending on the design requirements of the seat foam inspection gage 10.

In operation, the seat foam inspection gage 10 of the present invention generally may be a hand held device that may be carried in a briefcase, tool chest, box or any other carrying case or mechanism. The briefcase may be capable of being carried into the manufacturing facility of the seat foam 12 or vehicle seats depending on the location of the manufacturing processes therefore. The user of the seat foam inspection gage 10 may then remove the seat foam inspection gage 10 from the carry case and place it on a flat surface. Next that user may turn on, via a button located on the indicator 14, the seat foam inspection gage 10 and then zero the seat foam inspection gage 10 by hitting the zero or calibration button on the face of the indicator 14. This may place the seat foam inspection gage 10 into the proper mode for use in measuring foam displacement on the seat foam 12. Next, the user of the seat foam inspection gage 10 may mark an area of measurement on the seat foam 12 that the seat foam inspection gage 10 may be placed. This marking may be done by any known marking technique, such as with a pen, marker, tape, or any other known technique to mark a certain area on the surface of the seat foam 12. It should be noted that it is also contemplated not to lark the area of measurement on which the seat foam inspection gage 10 may be placed depending on the design requirements and the environment in which the seat foam inspection gage 10 is being used. After the area has been marked, the user of the seat foam inspection gage 10 may decide to take the surface temperature of that area. The surface temperature may be taken via a hand held temperature probe or other device that may record the temperature of the seat foam 12 in the environment in which the seat foam inspection gage 10 is being used. It should further be noted that it is not required that the surface temperature of the area being tested by the seat foam inspection gage 10 is taken. After the area has been marked or not marked and the temperature taken or not taken, the user of the seat foam inspection gage 10 may place the seat foam inspection gage 10 directly and firmly on the pre-designated area or the area being tested and record a reading from the display of the indicator 14. The seat foam inspection gage 10 is placed such that the ball 24, which starts in a neutral position, i.e., extending from the bottom edge of the first plate 22 may be placed in contact with the seat foam inspection gage 10 and the surface of the seat foam being measured. This may allow the ball 24 to compress or depress into the surface of the seat foam and measure a displacement of that seat foam and hence, giving the seat foam a hardness based on the displacement of the seat foam with respect to the seat foam inspection gage 10 and ball 24 movably arranged within the inner bore 18 of the seat foam inspection gage body 16. The user of the seat foam inspection gage 10 may test multiple areas on the surfaces of the seat foam 12 for the seat cushion or seat back to ensure a uniform seat foam hardness that meets all requirements and specs of the engineering drawings. It should be noted that certain areas of the seat cushion or seat back may require a first seat foam hardness while a second area may require a second and different seat foam hardness, depending on the design requirements of the vehicle seat. The same testing procedure may be used on multiple different areas of either the seat back or seating surface of the seat foam 12 for the vehicle seat. After all of the displacement readings are completed, the seat foam inspection gage 10 may be turned off via the indicator 14 and returned to the carry case, which may also be a lockable carry case. Next, the user may take the recorded readings and use a conversion chart, such as that shown in the figures, to quickly determine if the seat foam hardness foam displacement readings are within the range or within the IFD range called out in the engineering drawing requirements of the vehicle seat being manufactured. This may allow for a quick hand held seat foam inspection gage 10 to be used to create foam displacement measurements that are converted into IFD readings, via a conversion chart or other electronic conversion system of the indicator 14 or other device in communication therewith, to allow for a quick solution to compare seat foam hardness across multiple different seats and/or an individual seat back or seat cushion on site of the manufacturing process. This may reduce time and costs by not having to send the seat foam 12 to an off site quality control lab to use a large frame machine that may require fixturing and set up time to determine the seat IFD measurements. It is also contemplated to take the measurements without making a marking on the seat foam 12 where the seat foam inspection gage 10 may be placed and without taking the temperature of the area to be tested by the seat foam inspection gage 10. It should further be noted that it is highly recommended that a seat frame also be used when doing the seat foam testing such that the seat foam 12 is already arranged on the seat frame. Furthermore, the areas being tested by the seat foam inspection gage 10 should be on a horizontal plane or as close to possible to a horizontal plane to ensure accurate readings via the seat foam inspection gage 10. It should be noted that if the seat frame is not available during testing, it is advisable to ensure that the areas in the center of the seat that are being inspected, are supported from the bottom surface of the seat foam 12 thus to ensure proper readings of the seat foam hardness across all surfaces of the seat foam 12. It should also be noted that taking the temperature of the area being tested by the seat foam inspection gage 10 may ensure for more accurate readings as the temperate of the foam may change the readings of the foam displacement indicator 14. By noting and recording the temperature of each location using the seat foam inspection gage 10 may allow for cross referencing to prior inspection dates, such that foam that is measured at 10° F. colder than other measurements may have up to a half of a millimeter less displacement. This may allow for the temperature factor to be compensated for when comparing measurements from different dates and different locations. Furthermore, humidity in the inspection area also may be needed to be monitored if the data is being compared to a different date or to actual IFD readings made at another site. The conversion chart as shown in the figures is based on fifty percent relative humidity, however if the humidity is at twenty percent than a half of a millimeter must be added to the foam inspection gage reading in order to use the conversion chart in a proper manner. Furthermore, if the humidity is at seventy percent, then a reduction of approximately one half millimeter must be made from the gage reading in order to use the conversion chart as shown in the figures. However, it is also contemplated to have numerous conversion charts for different relative humidity and temperatures in order to ensure uniformity of the numbers being measured by the seat foam inspection gage 10, which is a portable and hand held device in the present invention. The use of the hand held seat foam inspection gage 10 having a foam displacement indicator 14 arranged therein allows for a quick solution to compare seat foam hardness at the actual manufacturing site of the seat foam 12 thus reducing costs to manufacture the vehicle seats.

The present invention has been described in an illustrative manner. It is to be understood that the terminology which has been used is intended to be in the nature of words of description rather than that of limitation.

Many modifications and variations of the present invention are possible in light of the above teachings. Therefore, in the scope of the appended claims, the present invention may be practiced otherwise than as specifically described.

What is claimed is:

1. A seat foam inspection gage, said gage comprising:
a cylindrical body;
a ball arranged within said body, said ball having a diameter, said diameter is less than an inner diameter of said body, said diameter is greater than an inner diameter of a first ring plate; and
an indicator arranged on a top surface of said body, said indicator measures a distance of a foam displacement.

2. The gage of claim 1 wherein said first ring plate is secured to a bottom surface of said body.

3. The gage of claim 2 wherein said first ring plate having a tapered inner diameter.

4. The gage of claim 3 wherein said tapered inner diameter ensures said ball remains within a bore of said body.

5. The gage of claim 1 further comprising a second ring plate secured to a top surface of said body.

6. The gage of claim 5 further comprising a bushing arranged within an orifice of said second ring plate.

7. The gage of claim 6 further comprising a collar arranged within a bore of said bushing.

8. The gage of claim 7 wherein a portion of said indicator is arranged within a bore of said collar.

9. The gage of claim 1 further comprising a dowel arranged within an orifice, said orifice is arranged through a wall of said body.

10. The gage of claim 9 wherein said dowel extends into a bore of said body.

11. The gage of claim 1 wherein said ball is stainless steel, said ball is moveable within a bore of said body.

12. The gage of claim 1 wherein said ball is in contact with said indicator.

13. The gage of claim 1 wherein said indicator having a zeroing button.

14. The gage of claim 1 wherein said indicator measures distance of foam displacement in a handheld gage, said measured distance is then converted to an indention force deflection value.

15. A portable method of inspecting seat foam hardness, said method comprising the steps of:
placing a hand held foam displacement gage on a flat surface;
zeroing said hand held foam displacement gage while on said flat surface;
placing said hand held foam displacement gage on a predetermined area of the seat foam;

recording an amount of foam displacement via said hand held foam displacement gage; and converting said amount of foam displacement to a seat foam indentation force deflection, wherein said handheld foam displacement gage includes a cylindrical body, a ball arranged within a bore of said body and an indicator secured to a top surface of said body, said ball having a diameter, said diameter is less than an inner diameter of said body, said diameter is greater than an inner diameter of a first ring plate.

16. The method of claim 15 further comprising the steps of marking said predetermined area on a surface of the seat foam; and measuring a surface temperature of said predetermined area of the seat foam.

17. The method of claim 15 further comprising the step of turning on said hand held foam displacement gage.

18. The method of claim 15 further comprising the steps of turning off said hand held foam displacement gage after said step of recording.

19. The method of claim 15 wherein said ball engages the seat foam and said indicator during said recording step.

* * * * *